United States Patent [19]

Robinson

[11] Patent Number: 4,566,511
[45] Date of Patent: Jan. 28, 1986

[54] SANDER ATTACHMENT FOR ROTARY POWER SAW

[76] Inventor: James L. Robinson, 4706 Hazel Ave., Philadelphia, Pa. 19143

[21] Appl. No.: 609,497

[22] Filed: May 11, 1984

[51] Int. Cl.⁴ .............................................. B27C 9/02
[52] U.S. Cl. ................................... 144/1 F; 144/1 E; 51/170 PT; 51/241 R; 30/122
[58] Field of Search ......... 51/241 R, 170 R, 170 PT; 30/122, 500; 144/1 E, 1 F

[56] References Cited

U.S. PATENT DOCUMENTS

| | | | |
|---|---|---|---|
| 1,663,486 | 4/1926 | Wertz . | |
| 1,779,031 | 9/1925 | Casey . | |
| 1,850,137 | 5/1929 | Pursell . | |
| 2,244,586 | 3/1940 | Venable . | |
| 2,676,624 | 7/1951 | Gecmen | 51/170 R |
| 3,282,308 | 11/1964 | Sprague . | |
| 3,506,044 | 7/1967 | Evans | 51/170 R |
| 3,596,411 | 3/1970 | Hutchins | 51/170 PT |
| 3,648,413 | 3/1972 | Godwin et al. | 51/170 PT |
| 3,793,782 | 2/1974 | Bowling | 51/170 PT |
| 3,903,657 | 9/1975 | Pfister | 51/170 PT |
| 3,916,586 | 11/1975 | Rivas | 51/170 PT |
| 4,019,407 | 4/1977 | Penberthy | 51/170 PT |
| 4,033,035 | 7/1977 | Trimmer | 30/122 |
| 4,118,897 | 10/1978 | Martin | 51/170 EB |
| 4,317,282 | 3/1982 | Pace | 30/122 |

Primary Examiner—Roscoe V. Parker
Attorney, Agent, or Firm—Steele, Gould & Fried

[57] ABSTRACT

A sander attachment for a rotary power saw of the type having a removable saw blade and a housing mounted to pivot with respect to a platform, includes a support plate clampable to the saw platform, a shaft carrying an abrading wheel, the shaft having a first end to be driven by the saw in place of the blade, the shaft being rotatably fixed by an opposite end to an adjustable arm remote from the saw, in order to maintain the alignment of the working shaft regardless of the height adjustment set by pivoting of the saw.

16 Claims, 8 Drawing Figures

SANDER ATTACHMENT FOR ROTARY POWER SAW

BACKGROUND OF THE INVENTION

1. Field of the Invention

This invention relates to the field of attachments for power tools, especially to an abrading device for attachment to a portable rotary power saw.

2. Description of the Prior Art

Various devices have been conceived for changing the normal operation of a power tool to accomplish some other operation. Most frequently, such devices are based upon the motor of an electric drill, which has a convenient chuck to engage or disengage a driving shaft of some other power tool. Examples of such adaptations of power tools are seen in U.S. Pat. Nos. 1,850,137—Pursell, 4,118,897—Martin, and others.

Also known in the art are devices which purport to make a universal power tool from a motor and means for attaching the motor to a variety of cutting or abrading devices. In U.S. Pat. Nos. 1,663,486—Wertz and 1,779,031—Casey, universal tools are disclosed in which rotary saws are one of the options provided for mounting the motors and parts.

U.S. Pat. No. 4,033,035—Trimmer discloses an attachment device for a portable rotary power saw, in which the rotary power saw is altered to function as a chain saw. As disclosed, the device is said to be useful for beam cutting and mitering. The usual rotary saw blade is removed and the saw housing is attached to a support plate which carries a chain saw attachment including a sprocket and track for supporting a toothed roller chain. In order to tension the chain saw, that is, to pull the chain against its track, the rotary saw's capability of adjusting the depth of the cut of the saw blade is employed. Specifically, the platform upon which the rotary saw usually rests is clamped to a support platform for the attachment; the chain is run over a sprocket on the saw motor shaft; and, the rotary saw is rotated up around its pivot pin to space the motor shaft from the track, thereby tightening the chain. This device employs the vertical adjustment capabilities of a rotary saw, but only for tensioning. The device merely attaches a different form of saw blade, a toothed chain rather than toothed disk, to the same point of attachment on a rotary saw, and with the same stresses as are characteristic of the rotary saw.

U.S. Pat. No. 2,676,624—Gecmen discloses another version of an attachment for a rotary saw. In Gecmen, a supplemental supporting structure is attached to the platform of a conventional rotary power saw, such that the saw can be made to trace a cut at a predetermined distance from an edge of a board or the like. Thumbscrew clamps attach the various parts of the Gecmen device, but the blade remains in place. No attempt is made to engage the power-producing element, namely the saw motor.

The present invention adapts the conventional high powered portable rotary power saw to a situation in which an abrading wheel, planing wheel or similar working wheel is to be applied with a transverse force to a point which is axially spaced from the usual position of the saw blade in a rotary power saw. The axis of rotation is adjustable using the power saw adjustment, and the transverse force applied in use is directly opposed notwithstanding the adjustment capability. The saw is vertically-adjustable by rotation around a pivot point spaced from axis, such rotation causing displacement along two axis in the plane. In other words, vertical adjustment of the working wheel is accomplished such that the axis of rotation can be both raised with respect to the working surface, and also moved forward and backward relative to the attachment structure, thereby maintaining the mount for the end of the shaft carrying the working wheel along the axis of the power source.

According to the invention, a preferably length-adjustable shaft is affixed to the saw motor in place of the usual saw blade and the support table of the saw is attached to a support platform which carries an adjustable rotation mounting for an opposite end of the working shaft. Preferably, the movable rotation mounting is a pivotal, slidable adjustment arm which can be manually adjusted vertically using a thumbscrew. According to the invention, the high power capabilities of the rotary saw can be usefully applied to drive an attachment device in which transverse pressure is applied to the working shaft primarily at a point which is spaced from the conventional mounting point of the saw blade, without dangerous vibration or undue wear on the saw, its mountings and the attachment structure.

SUMMARY OF THE INVENTION

It is an object of the invention to provide a removable abrading attachment device which derives power from a portable rotary power saw.

It is also an object of the invention to provide a sanding or planing device having high powered capability, using an inexpensive attachment to an existing tool.

It is another object of the invention to provide an attachment for a rotary power saw in which a supplemental rotational mounting of a working shaft supports an abrading device at a fitting remote from the housing of the rotary saw motor.

It is yet another object of the invention to provide an auxiliary apparatus having a shaft supported by a spaced rotational mounting which is adjustable to position the axis of rotation of the shaft at any point in a plane perpendicular to the axis.

It is still another object of the invention to adjust the point of attachment of the shaft in such a device axially with respect to the driving means.

These and other objects are accomplished by an abrading attachment for a portable rotary power saw of the type having a removable saw blade and a housing mounted to pivot with respect to a platform, including a support plate clampable to the saw platform, a shaft carrying an abrading wheel, the shaft being mounted at one end to an adjustable arm remote from the saw, in order to maintain the alignment of the working shaft with the rotation axis of the saw.

BRIEF DESCRIPTION OF THE DRAWINGS

There are shown in the drawings the embodiments which are presently preferred. It should be understood, however, that the invention is not limited to the precise arrangements and instrumentalities shown in the drawings wherein.

DETAILED DESCRIPTION OF THE PREFERRED EMBODIMENTS

Figure 1:
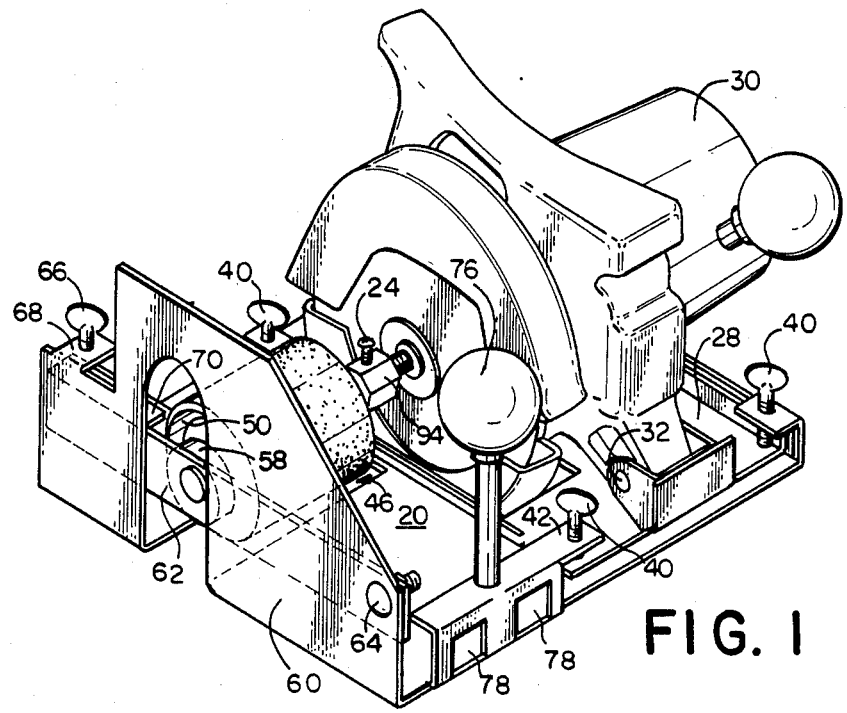
FIG. 1 is a perspective view of the device of the invention, installed on a rotary power saw.

The device of the invention is shown operationally attached to a portable rotary power saw in FIG. 1. In general, rotary saw 30 is pivotally adjustably mounted to its own supporting platform 28, which is clamped to an attachment platform 20. An upstanding end of the attachment platform 20 supports a rotational mounting 58 for one end of a working shaft. The other end of the shaft is attached by means of slidable fitting 94 to the power driven saw shaft, at the driving axis of the saw, and in place of the usual rotary saw blade. The working cylinder is mounted to extend slightly through an opening 46 in platform 20 such that the user can apply the working wheel 50 to a surface to be abraded, planed, or the like.

The power switch for the saw is conventionally a trigger switch located on the handle of the saw, toward the rear with respect to FIG. 1. The user places one hand on the saw handle and the other handle on grip 76 of the attachment apparatus, and thereby securely holds the overall device at opposite corners for application of the abrading wheel to a surface. The overall design of the device, namely based upon an enlarged platform for the rotary saw housing, is quite secure and resists the tendency of such devices to "jump" with respect to the surface being treated.

The device is also stable by virtue of the fact that the end of the working shaft is mounted such that the rotational axis is rigidly fixed with respect to the support platform by virtue of adjustment arm 62. Downward force exerted on the abrading wheel against a surface to be treated will be opposed by both the mounting of the drive shaft of the saw and also by the rotational bushing 58, affixed to an intermediate area on adjustment arm 62. This adjustable arm is itself mounted to the standing side 60, preferably an integral part of the attachment table, bent perpendicularly upwards to provide a vertical means of adjustment.

Figure 2:
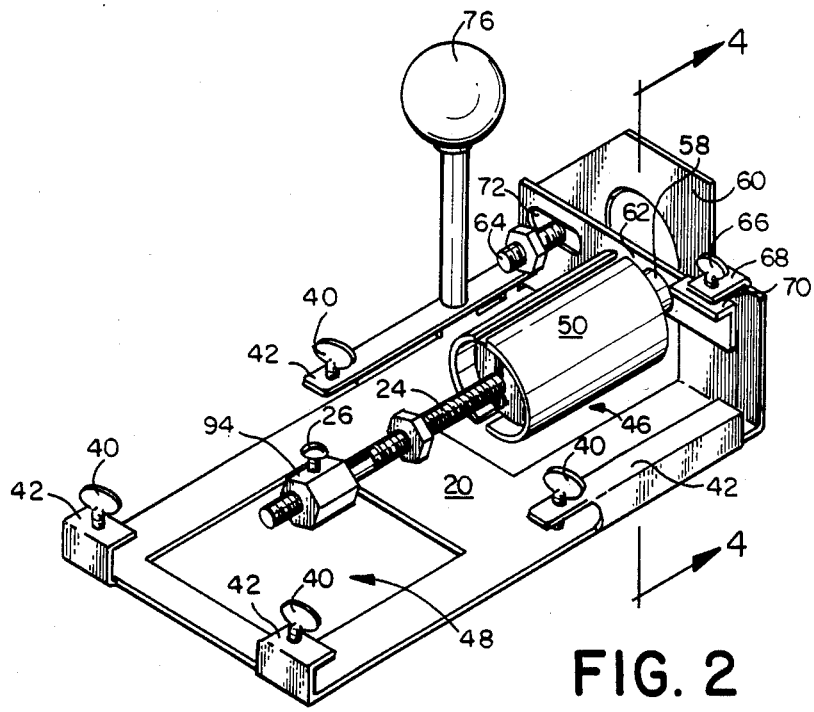
FIG. 2 is a perspective view of the attachment standing alone, from the opposite corners as compared to FIG. 1.

FIG. 2 shows the attachment device standing apart from the saw, and rotated 180° C. with respect to FIG. 1. Platform 20 defines a mounting area for a rotary saw towards the left in FIG. 2, and a working abrading area towards the right, at opening 46. The rotary saw, which has a support platform of its own, is attached to the supporting platform of device 20 by means of thumbscrews 40, each of which is threadably mounted in a flange portion 42, spaced slightly over the body of platform 20, operable to bear downward to clamp the saw support platform on attachment platform 20.

Figure 3:
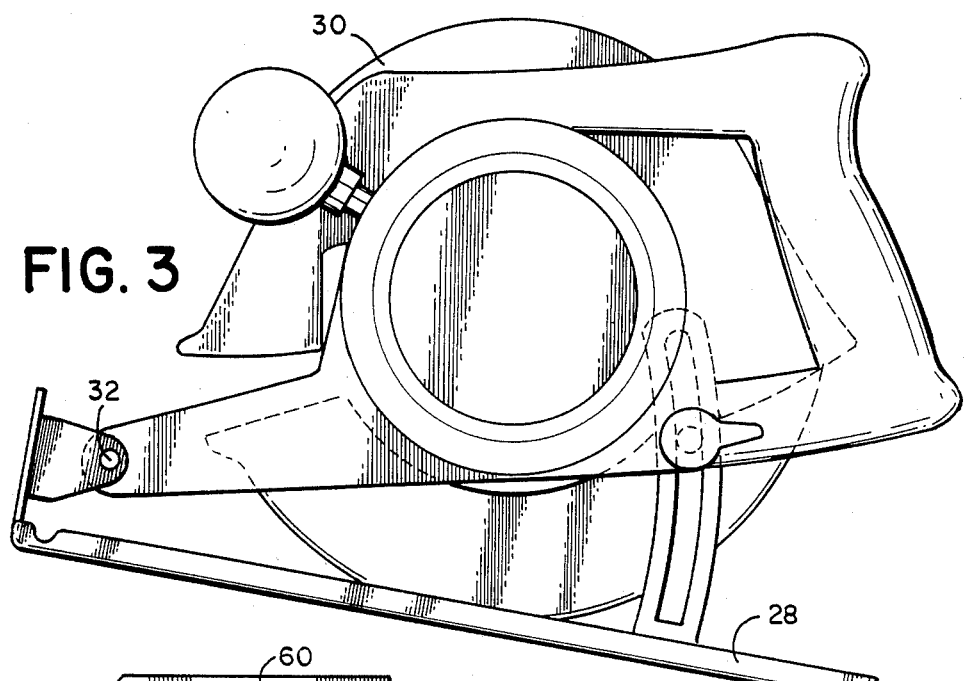
FIG. 3 is an elevation view of a conventional rotary power saw.

As shown in FIG. 3, the typical rotary saw 30 comprises a housing mounted such that the axis of rotation is vertically adjustable with respect to a platform 28, by means of a wing nut or the like which acts on an arched, slotted support flange to restrict rotation of the housing around the pivot point 32. The pivot pin is necessarily spaced from the axis of rotation, whereby accordingly, the user can adjust the height of the rotation axis by rotating the housing around pivot 32 and locking the housing where desired. Such saws usually also have a tilt adjustment for the blade. In the normal operation of a rotary saw, the user is not concerned with the fore-and-aft position of the rotation axis with respect to saw supporting platform 28, but only the vertical position as a means to adjust the depth of cut. Therefore, it is normally of no consequence that the vertical adjustment is accomplished by rotation of a pivot point. According to the invention, the auxiliary working shaft is strengthened by a fitting at its end. In order to translate the vertical adjustment of the saw axis into a vertical adjustment for a driven attachment, means are provided to allow any remotely-supported portion of the driven shaft to move forward and backward with respect to platform 28.

According to the invention, a movable fitting allows both a vertical adjustment and horizontal fore-and-aft adjustment of a rotational mounting with respect to the saw platform. With respect to FIG. 1, the rotation of adjustment arm 62 can be based upon a pivot point 64 aligned axially with the pivot 32 of the saw. Preferably, however, the adjustment arm 62 upon which the rotational mounting is affixed, is fully adjustable to any point in the plane defined by standing support member 60.

Figure 4:
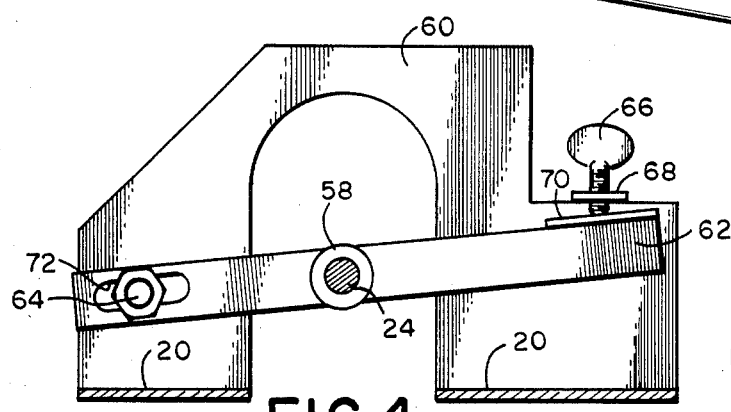
FIG. 4 is a section view taken along lines 4—4 in FIG. 2.

As shown in FIG. 2, adjustment arms 62 is preferably mounted by means of a slot 72 and pivot bolt 64, at one side, and at the other side is only vertically restrained by means of a set screw 66. Such screw 66, namely a thumscrew, is threadably mounted in flange 68 of support member 60. Thumscrew 66 bears against a tab of support arm 62, to force the end of the adjustment arm to the required vertical position. By virtue of slot 72 and bolt 64, the arm is both pivotal and lengthwise slidable on bolt 64. Bolt 64 carries a friction nut for restricting the freedom of movement and for restricting vibration The details of adjustment are shown in FIG. 4. Working shaft 24, which is mounted by one end to the saw motor (not shown) is mounted at the opposite end to rotational fitting 58, affixed to adjustment arm 62. Arm 62 is allowed a range of movement by means of slot 72 with respect to bolt 64, thereby giving a lengthwise movement corresponding to fore-and-aft adjustment with respect to table 20. Screw 66, bearing against tab 70, adjusts the vertical position of the opposite end of arm 62, with respect to tab 68 of support 60. The pivot of the adjustment arm need not be aligned precisely coaxially with the pivot axis 32 of the rotary saw mounting in order to achieve a precise vertical adjustment of a device for attachment to a rotary saw. If desired, fitting 58 can also be a universal joint, that is, allowing a tilt of the working shaft with respect to horizontal for uneven abrading.

The details of connection between the rotary saw and the drive shaft 24 are also shown in FIG. 2. Working cylinder 50, which may be of any appropriate axial length, is mounted on shaft 24 to extend through opening 46. Shaft 24 is preferably threaded such that a locknut can be run along the shaft to hold the working cylinder in position. If desired, the working cylinder can be only frictionally attached to the shaft such that any undue resistance will merely allow the cylinder to rotate with respect to the shaft.

The distance between the attachment means for the saw and the working cylinders preferably adjustable. Sliding fitting 94 is primarily a bolt which is threadably fittable into a threaded hole in the motor shaft on one end, and slidably fittable over an unthreaded end of working shaft 24. The junction of fitting 94 and shaft 24 is thereby length adjustable and can be locked once adjusted by means of set screw 26. If desired, a flat side or keyway can be provided in shaft 24 to further secure the fitting 94 and shaft 24 against relative rotation.

Figure 6:
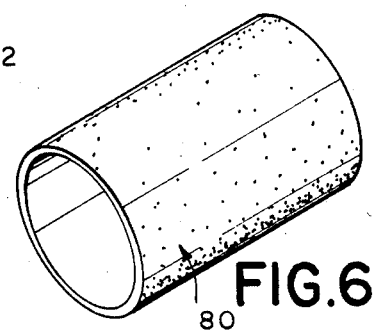
FIG. 6 is a perspective view of a sand cylinder for use on the working shaft.
Figure 5:
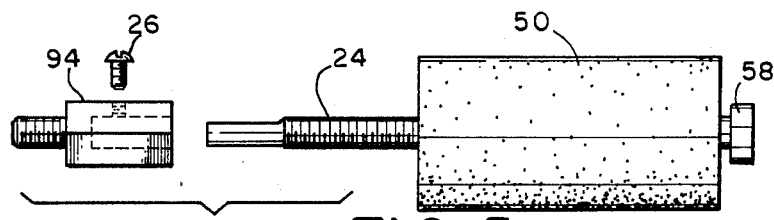
FIG. 5 is an exploded elevation view of the working shaft of the invention.

FIG. 5 shows the respective parts of the working shaft in exploded view. Slidable fitting 94 is threadably attached to a female thread opening in the shaft of the saw motor. Working shaft 24 is flatted on one side for engagement with set screw 26. Shaft 24 carries abrading wheel 50, for example a sandpaper cylinder 80 as shown in FIG. 6. Such a cylinder may be locked in position on shaft 24 by means of endcaps which are axially engaged by nuts on threaded shaft 24. Shaft 24 is allowed to rotate with respect to the adjustment arm by means of a bushing 58, which may include bearings or the like for reduction of friction.

Upon installation, the user can easily set the parameters of operation. The nut on bolt 64 and the thumbscrew 66 should first be loosened to allow free initial positioning. The saw is clamped down using screws 40. The user adjusts the vertical height of the motor shaft, and optionally sets the angle of shaft tilt as desired, using the same controls as used for the saw itself. Working shaft 24 can be attached to the saw before or after the height and tilt are adjusted, but it is preferred that the shaft be attached first so the user can visually check the adjustments. Without placing any load on the abrading wheel, the user tightens themscrew 66 against arm 62 and runs the nut down snug on bolt 64. The unit is then ready for use.

Figure 7:
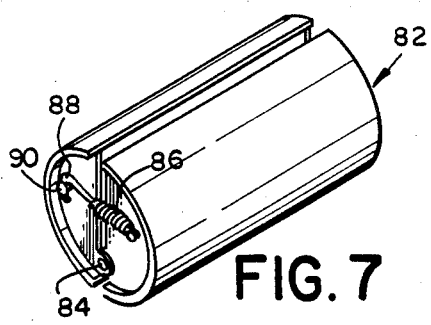
FIG. 7 is a perspective view of a working cylinder adapted to engage a sheet of abrasive material; and, FIG. 8 is a perspective view of a planing wheel according to the invention.

Various options and refinements of the invention are also possible. In FIG. 7, a device is provided in which a linear sheet of sandpaper can be wrapped around a split, spring-biased cylinder, in order to hold the sheet in the tubular orientation required for the device. Split cylinder 82 comprises two halves pivotally attached at pin 84 and biased to close down by spring 86 tending to draw pin 90 toward the spring by means of hook 88. This embodiment also tends to draw the two halves down around the drive shaft (not shown in FIG. 7), and is suitable for a frictional attachment.

Figure 8:
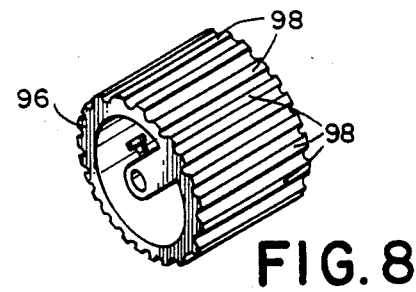

In FIG. 8, the working wheel is a planing cylinder 96, having raised teeth 98, which tend to abrade away surface material as well. A set screw may be used to attach wheel 96 to shaft 24, or axially-bearing nuts can be threadably run along shaft 24 to engage the wheel. The wheel may be of any longitudinal size. Another alternative is to use a grinding wheel for the abrading element.

Various modifications to the invention will now become apparent to skilled persons in light of this disclosure. For example, a more extensive or modified attachment housing may be included on the mounting platform, including sawdust-releasing openings 78 as shown in FIG. 1 or the like to avoid accumulating sawdust. Different abrading or cutting mechanisms can also be employed, and used in place of or together with saw blades, such as Dado cutters or the like. Reference should be made to the appended claims rather than the foregoing specification as indicating the true scope of the invention.

What is claimed is:

1. An apparatus for attachment to a portable rotary saw of the type having a housing with a motor and means for removably attaching a saw blade to a motor shaft thereof, the saw drive unit also having a platform and means for positioning the motor shaft relative to the platform, the apparatus comprising:
   a support plate having clamping means to engage the platform;
   an adjustment arm attached to the support plate and movable toward and away from the support plate; and,
   a working wheel mounted on a shaft rotatably fixed to the adjustment arm and engageable at one end to the means for attaching the saw blade, in place of said saw blade.

2. An apparatus according to claim 1, wherein the adjustment arm is movable fore-and-aft along a direction parallel to the support plate as well as toward and away from the support plate.

3. An apparatus according to claim 1, wherein the working wheel is an abrading cylinder.

4. An apparatus according to claim 1, wherein further comprising means defining a hand hold for manipulation of the apparatus.

5. An apparatus according to claim 2, wherein the adjustment arm is movably mounted on an extension of the support plate perpendicular to the support plate.

6. An apparatus according to claim 5 wherein the adjustment arm has a slot adjacent one end thereof and the adjustment arm is mounted on the extension by means of a bolt through the slot and an adjustable stop movable against an opposite end of the arm.

7. An attachment for a portable circular saw having a removable vertically-adjustable blade and a platform for supporting the saw, the attachment comprising:
   a support plate having means to engage the platform;
   a working shaft having an abrading wheel thereupon, an end of the shaft being attachable to the saw in place of the blade; and,
   means for supporting the shaft remote from the saw, said means for supporting being adjustable relative to the support plate for holding the shaft with respect to the support plate.

8. An apparatus according to claim 7, wherein the support plate has at least one flange having a thumbscrew threadably urging the platform against the support blade.

9. An apparatus according to claim 7, wherein the support plate has a plurality of thumbscrews on upturned flanges for urging the platform against the support plate, the platform being thereby engaged at a first end of the support plate.

10. An apparatus according to claim 9, wherein the means for supporting the shaft comprises an upturned end portion at an opposite end of the support, the support having an opening intermediate the ends for admitting the abrading wheel.

11. An apparatus according to claim 10, wherein the means for supporting the shaft further comprises an adjustment arm, the arm having a slot pivotally and slidably mounted on a pivot pin on said upturned end portion, a bushing for rotatably holding the shaft and a stop for locking the arm at a desired position.

12. An apparatus according to claim 1, wherein the working wheel is a sanding drum.

13. An apparatus according to claim 12, wherein the sanding drum is a cylinder split lengthwise into semicylindrical halves, spring means urging said halves together, sheets of abrasive material being engagable between the halves.

14. An apparatus according to claim 1, wherein the working wheel is a planing wheel.

15. An apparatus according to claim 1, wherein the working shaft is length-adjustable.

16. An apparatus according to claim 7, wherein the means for supporting the shaft defines a universal joint for the shaft, whereby the shaft is tiltable relative to the support plate.

* * * * *